United States Patent
Newman et al.

[11] Patent Number: 5,448,871
[45] Date of Patent: Sep. 12, 1995

[54] TRUSS HOLD-DOWN STRAP

[75] Inventors: Michael D. Newman; Jim W. Horton, both of Jacksonville, Fla.

[73] Assignee: Southeastern Metals Mfg. Co., Inc., Jacksonville, Fla.

[21] Appl. No.: 169,005

[22] Filed: Dec. 20, 1993

[51] Int. Cl.⁶ ............................................. E04B 1/38
[52] U.S. Cl. ......................................... 52/712; 52/702; 52/92.2; 403/400; 403/232.1
[58] Field of Search ............ 52/92.2, 102, 712–715, 52/702, 703, 693–696; 403/219, 232.1, 400

[56] References Cited

U.S. PATENT DOCUMENTS

| | | | |
|---|---|---|---|
| 3,036,347 | 5/1962 | Findleton | 52/702 |
| 3,184,800 | 5/1965 | Nelson | 52/92.2 |
| 4,022,537 | 5/1977 | Gilb et al. | 52/715 |
| 4,047,352 | 9/1977 | Sweet | 52/712 |
| 4,527,375 | 7/1985 | Braginetz | 52/712 |
| 4,665,672 | 5/1987 | Commins et al. | 52/702 |
| 4,713,923 | 10/1987 | Sielaff et al. | 52/92.2 |
| 5,240,342 | 8/1993 | Kresa, Jr. | 52/702 |

FOREIGN PATENT DOCUMENTS 0851125  7/1952  Germany ..................... 403/232.1

*Primary Examiner*—Carl D. Friedman
*Assistant Examiner*—Winnie S. Yip
*Attorney, Agent, or Firm*—Arthur G. Yeager

[57] ABSTRACT

A continuous narrow, elongated metal member bent to form a strap for holding down a truss, the strap having a saddle portion to fit over the truss and two arms diverging therefrom to lie flat against the plates upon which the truss is supported and adapted to be nailed or otherwise fastened to the plates.

17 Claims, 1 Drawing Sheet

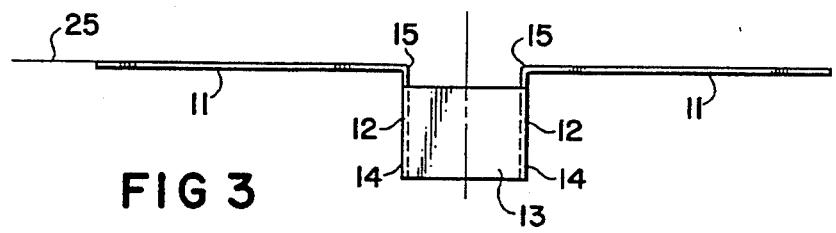
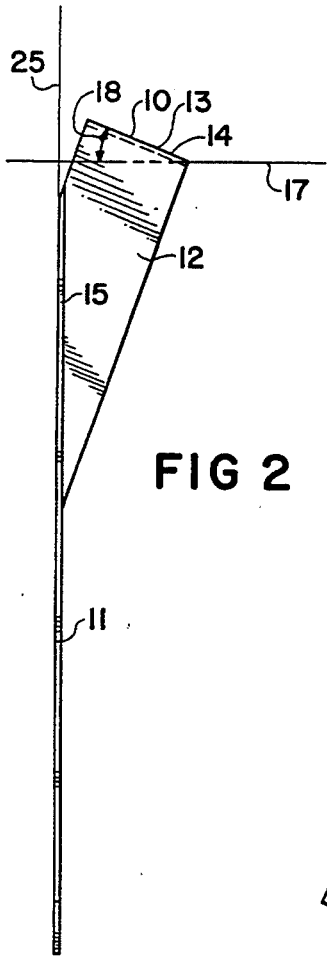
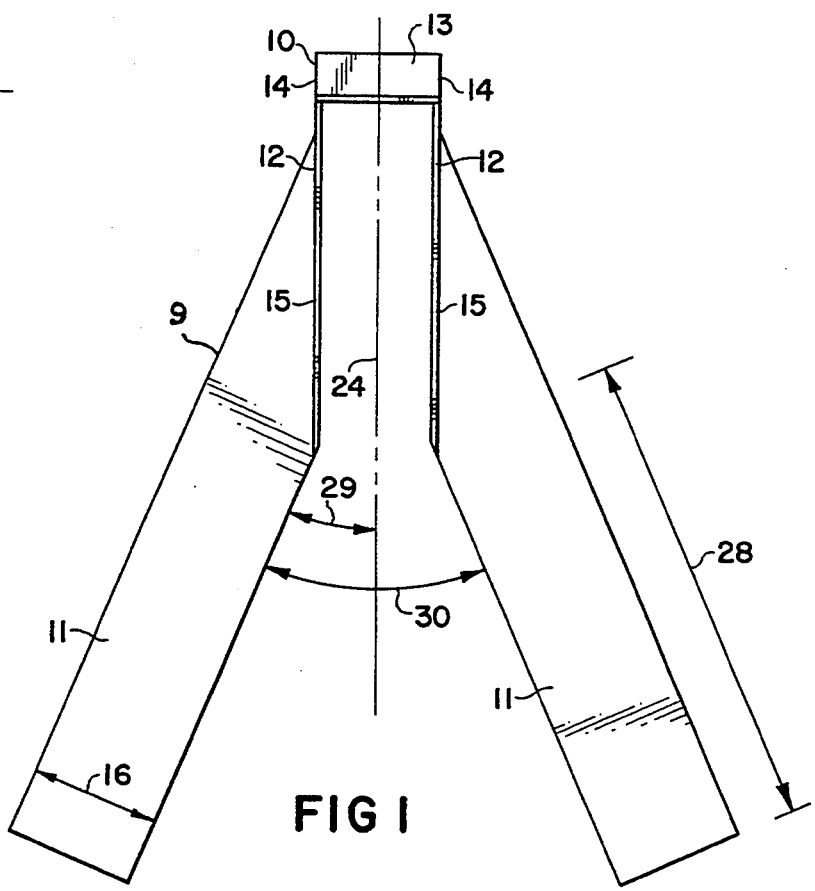
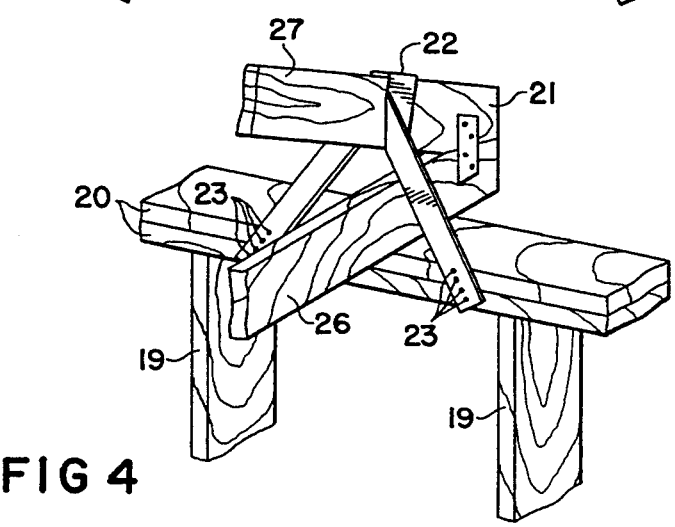

TRUSS HOLD-DOWN STRAP

BACKGROUND OF THE INVENTION

1. Field of the Invention

This invention relates to metal straps to hold roof trusses to the upper ends of vertical walls of a structure.

2. Description of the Prior Art

In the construction of wooden framed residences or other structures there are many joints that in the past were fastened together by toe nailing which is not as secure as one would like for fixing a joint. In the past several years there have been several developments of fasteners and hangers made of steel plate or strip that have made such joints much more secure than ever before. Furthermore, the modern usage of prefabricated trusses for roof supports has made it important to provide hangers and fasteners for trusses to make them more secure against damage from winds and in general to be stronger.

It is an object of this invention to provide a strap that adds strength to resist the separation of a truss from its supporting structure of studs and plates. It is another object to provide a strap made of a single strip of metal bent to the form of the desired hold-down strap. Still other objects will become apparent from the more detailed description which follows.

BRIEF SUMMARY OF THE INVENTION

This invention relates to a strap to hold down a truss resting on a plate, a single, continuous elongated strip having a central saddle portion and two arms diverging therefrom; the saddle portion including two spaced parallel vertical sides and a top side perpendicular to both vertical sides; the arms diverging outwardly from the saddle portion at an included angle of about 40 degrees to 60 degrees, each arm lying in a common plane perpendicular to all sides of the saddle portion, and adapted to be fastened to a plate upon which the truss rests.

In specific and preferred embodiments of this invention the saddle portion of the strap fits snugly around the inclined beam of the truss and the arms are fastened by nails or the like to the plate or plates of the framework of the house. The strap generally is about 20–30 inches in total length and is from 1–3 inches in width. Preferably the arms diverge equally with respect to a central vertical axis, with a total included angle of 40 degrees to 60 degrees, i.e., about 20 degrees to 30 degrees on each side of the vertical axis.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood, by reference to the following description taken in connection with the accompanying drawings in which:

FIG. 1 is a front elevational view of the strap of this invention;

FIG. 2 is a side elevational view of the strap of this invention;

FIG. 3 is a top plan view of the strap of this invention; and

FIG. 4 is a perspective view of how the strap of this invention is used to hold down a truss.

DESCRIPTION OF THE PREFERRED EMBODIMENT

FIG. 4 shows how this invention is used and FIGS. 1–3 show the details of the strap 9 of the invention. The following description refers to the numbered components of the drawings.

In FIG. 4 there is shown a portion of the framework of a house including a plurality of spaced vertical studs 19 connected together at their upper ends by upper and lower plates 20 (in many instances only a single plate 20 is used). Opposite walls of studs 19 are connected by a plurality of spaced trusses 21 which also form a support for a roof. Trusses 21 are usually combinations of horizontal beams 26 and inclined beams 27 joined by diagonal and vertical support beams (not shown). Trusses 21 can be built in place or purchased ready made from lumber suppliers. The spacing between adjacent studs (usually 16–18 inches) may not be the same as the spacings between adjacent trusses and accordingly trusses 21 may be located in line with or not aligned with vertical studs 19. Hold-down straps have been available in the past with long arms 11 that are spread apart at such angles and sufficiently long to reach to the next available stud 19 in both directions from a truss 21 placed midway between adjacent studs 19. In the hold-down strap 9 of this invention arms 11 are fastened to plates 20 and need not conform to the lengths and angles employed in the past. This permits the strap 9 of this invention to be useful without regard to the positioning of truss 21 with respect to studs 19.

The particular details of the strap 9 of this invention are shown in FIGS. 1–3. The strap is a single strip of metal having a width 16 and an overall length to width ratio of about 10/1 to about 20/1. In the normal situation where inclined beam 27 (FIG. 4) is a two-inch beam the total length of the strap is about 20–30 inches, usually 22–26 inches. The strip preferably is galvanized steel of about 16–20 gauge, preferably 18 gauge. The strip may be prepunched with holes for nails or screws, but when nail guns are available, the strip is not prepunched and the carpenter is free to employ nails wherever he chooses. If there are two plates 20, it is preferable to use two spaced nails in each free end portion of arms 11 for each of plates 20. For a concrete lintel around the top of a wall, the straps 9 would be connected by concrete nails that are shot through the free end portion of arms 11 into the concrete lintel in a manner well known in the art.

The strap 9 of this invention includes a saddle portion 10 in the center of the strap and two arms 11 that diverge from saddle portion 10 at equal angles 29 on both sides of vertical axis 24 to form a total included angle 30. Angle 29 is about 20 degrees to 30 degrees making angle 30 to be about 40 degrees to 60 degrees. Preferably arms 11 are at equal angles 29 from axis 24, but arms 11 may be somewhat skewed, i.e., net equal on both sides of axis 24, and still be suitable if the total included angle is about 40 degrees to 60 degrees. Saddle portion 10 and arms 11 are formed from a single flat strip of metal by four fold lines 14 and 15. Fold lines 14 form two right angle bends between two parallel space sidewalls 12 and one transverse top wall 13. If the inclined beam 27 of truss 21 is a single beam (2×4, 2×6, 2×8, or the like) the spacing between sidewalls 12 is 1⅝ inches. If inclined beam 27 of truss 21 is a 4-inch beam or two 2-inch beams, the spacing between sidewalls 12 is 3¼ inches.

The other two fold lines 15 are between arms 11 and sidewalls 12. Arms 11 lie in a common vertical plane 25, flat against the vertical edges of plates 20. The orientation of fold lines 15 with respect to the edges of arms 11 produces the appropriate angle of inclination to match that of truss 21. As may be seen in FIG. 2 fold line 15 causes transverse top wall 13 of saddle portion 10 to be tilted at an angle 18 from the horizontal 17. This tilt angle 18 should, of course, match angle of inclination between beams 26 and 27 of truss 21 so that saddle portion 10 will fit snugly over inclined beam 27 of truss 21. Angle 18 is 20 degrees to 30 degrees in normal cases, but may be any angle chosen by the architect designing the house.

The preferred strap 9 of this invention is made of 18 gauge galvanized steel strip 1¾ inch wide (see 16 in FIG. 1). The spacing between sidewalls 12 is either 1⅝ or 3¼ inches and, and arms 11 are 6¼ inches long (see 28 in FIG. 1) from the bottom of fold line 15 to the end of the strap 9, each arm 11 being angled outwardly from vertical axis 24 by about 24 degrees (see 29 of FIG. 1).

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A strap to for holding down a truss resting on a horizontal plate, comprising a single, continuous elongated strip having a central saddle portion and two flat arms diverging therefrom, said saddle portion including two spaced parallel vertical sides and a top side perpendicular to both said vertical sides, said vertical sides being adapted to engage and lie flat against a part of a truss nestable within said saddle portion, said flat arms being respectively connected to said vertical sides and diverging outwardly from said saddle portion at an included angle between said flat arms of about 40 degrees to 60 degrees, both of said flat arms throughout their length lying in a common flat plane perpendicular to said vertical sides of said saddle portion, and adapted to be fastened to a common side of a horizontal plate upon which a truss rests.

2. The strap of claim 1 wherein said top side is slanted at an inclined angle to a horizontal plane and adapted to correspond to an angle of a truss resting on a horizontal plate.

3. The strap of claim 2 wherein said inclined angle is about 20 degrees to 30 degrees.

4. The strap of claim 2 wherein said vertical sides are from 1⅝ to 3¼ inches.

5. The strap of claim 1 wherein a ratio of a overall length to width dimensions of said strip is about 10/1 to about 20/1.

6. The strap of claim 1 wherein said flat arms terminate adjacent a plate upon which a truss rests.

7. A strap for holding down a truss supported by a horizontal plate resting on a plurality of spaced vertical studs, said strap being a single narrow elongated strip of metal bent to form a central saddle portion and two flat arms diverging outwardly therefrom at an angle of about 20 degrees to 30 degrees from being respectively connected to said vertical sides and respectively, said saddle portion including two spaced vertical walls perpendicular to a single transverse wall, said vertical walls being adapted to sandwich therebetween and be parallel to a part of a truss disposable within said saddle portion, said flat arms being respectively connected to said vertical walls and lying in a single vertical flat plane throughout their lengths with said flat plate being perpendicular to said vertical walls, said strip being about 1–2 inches wide and having a ratio of a length to width of about 10/1 to about 20/1.

8. The strap of claim 7 which is steel and is bent along four fold lines, two of which connecting said vertical walls to said transverse wall, and two of which connect said vertical walls to said flat arms, respectively.

9. The strap of claim 7 wherein said transverse wall is angled upward from a horizontal plane and adapted to match an angle of a truss resting on a horizontal plate.

10. The strap of claim 1 wherein said strip is steel and is bent along four fold lines, two of which are located between respective said vertical walls and said top side, and two of which are located between respective said vertical walls and said pair of flat arms.

11. A strap for holding down a roof truss resting on a horizontal plate of a wall comprising a single, continuous elongated strip having a central inverted saddle portion and a pair of spaced flat arms diverging downwardly therefrom, said saddle portion including a pair of spaced parallel vertical sides and a top side perpendicular to each of said vertical sides, said flat arms diverging downwardly and outwardly from said saddle portion at an included angle between said flat arms of about 40 degrees to 60 degrees, both of said flat arms throughout their length from said saddle portion lying in a common flat plane perpendicular to and connected to each of said vertical sides of said saddle portion, each of said flat arms having free end portions, said saddle portion being adapted to receive a part of a roof truss engaged throughout with said vertical sides and with said end portions of said arms adapted to be fastened to a horizontal plate supporting a roof truss.

12. The strap of claim 11 wherein said top side is slanted substantially at an inclined angle to a horizontal plane and adapted to correspond to an angle of a roof truss resting on a horizontal plate.

13. The strap of claim 12 wherein said inclined angle is about 20 degrees to 30 degrees.

14. The strap of claim 11 wherein said vertical sides are from 1⅝ to 3¼ inches.

15. The strap of claim 11 wherein a ratio of a overall length to width dimensions of said strip are about 10/1 to about 20/1.

16. The strap of claim 11 wherein said free end portions terminate adjacent a location occupied by a plate supporting a roof truss.

17. The strap of claim 11 wherein said strip is steel and is bent along four fold lines, two of which are located between respective said vertical walls and said top side, and two of which are located between respective said vertical walls and said pair of flat arms.

* * * * *